UNITED STATES PATENT OFFICE.

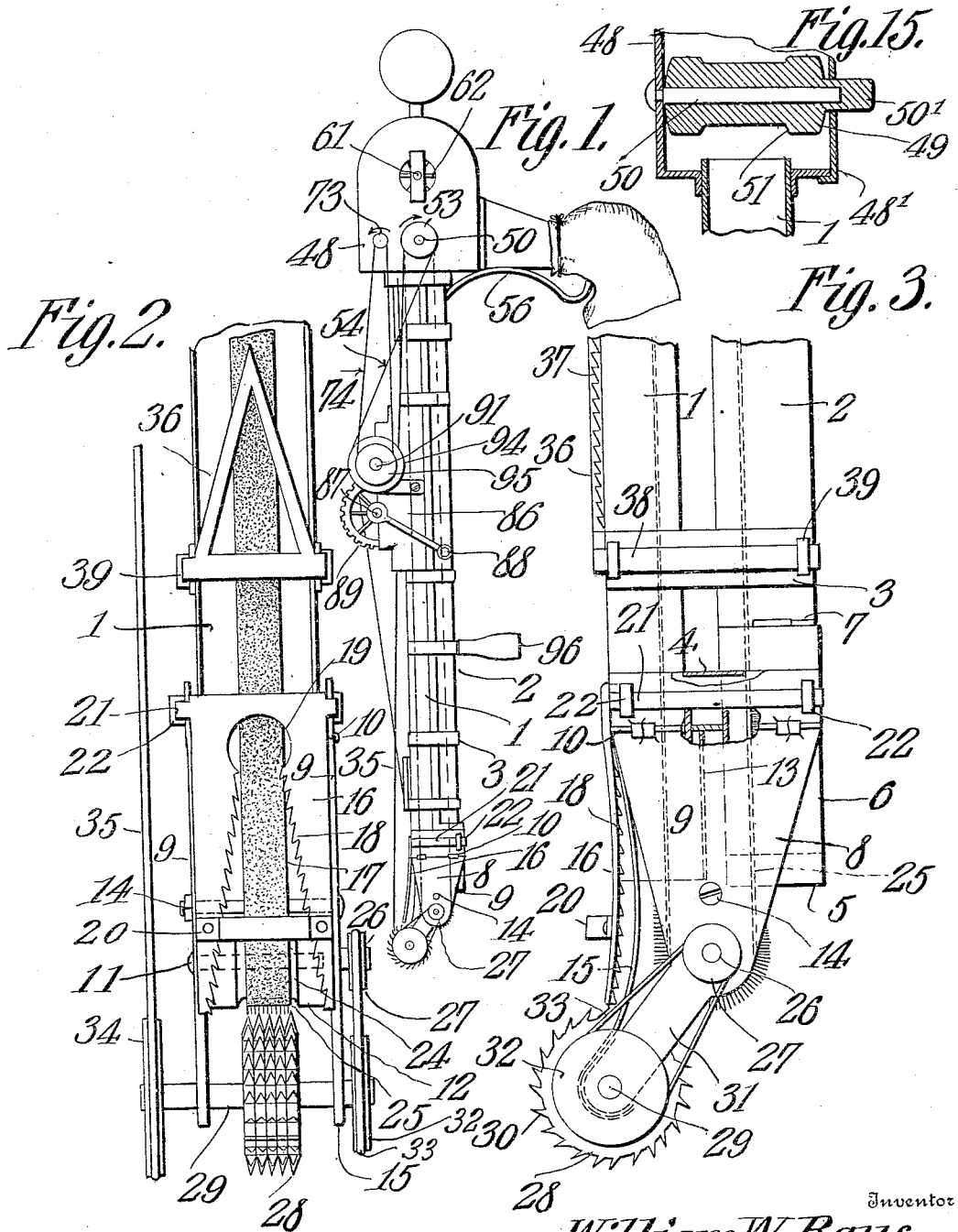

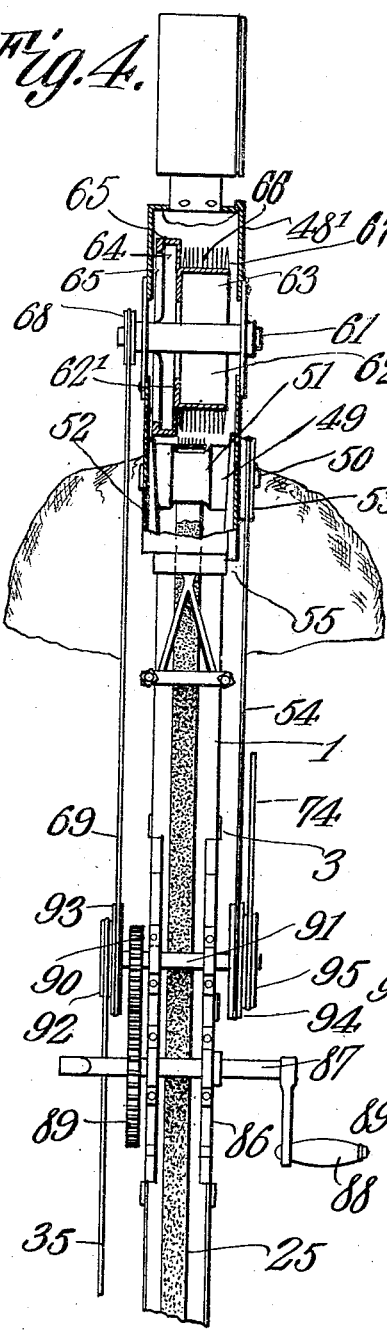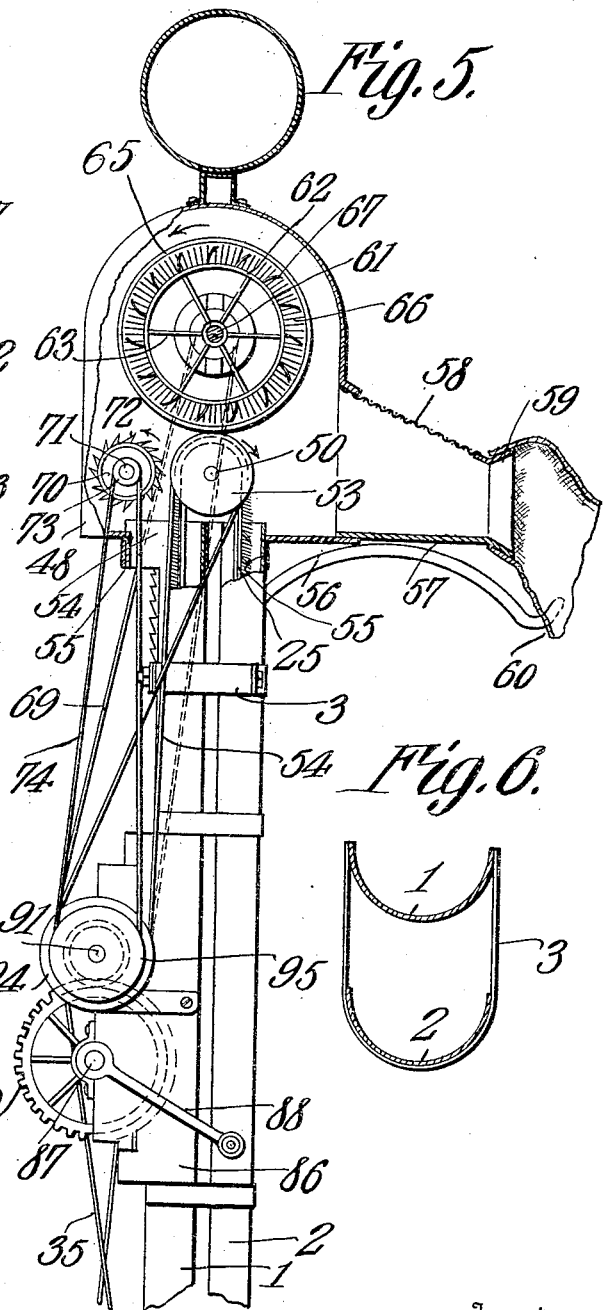

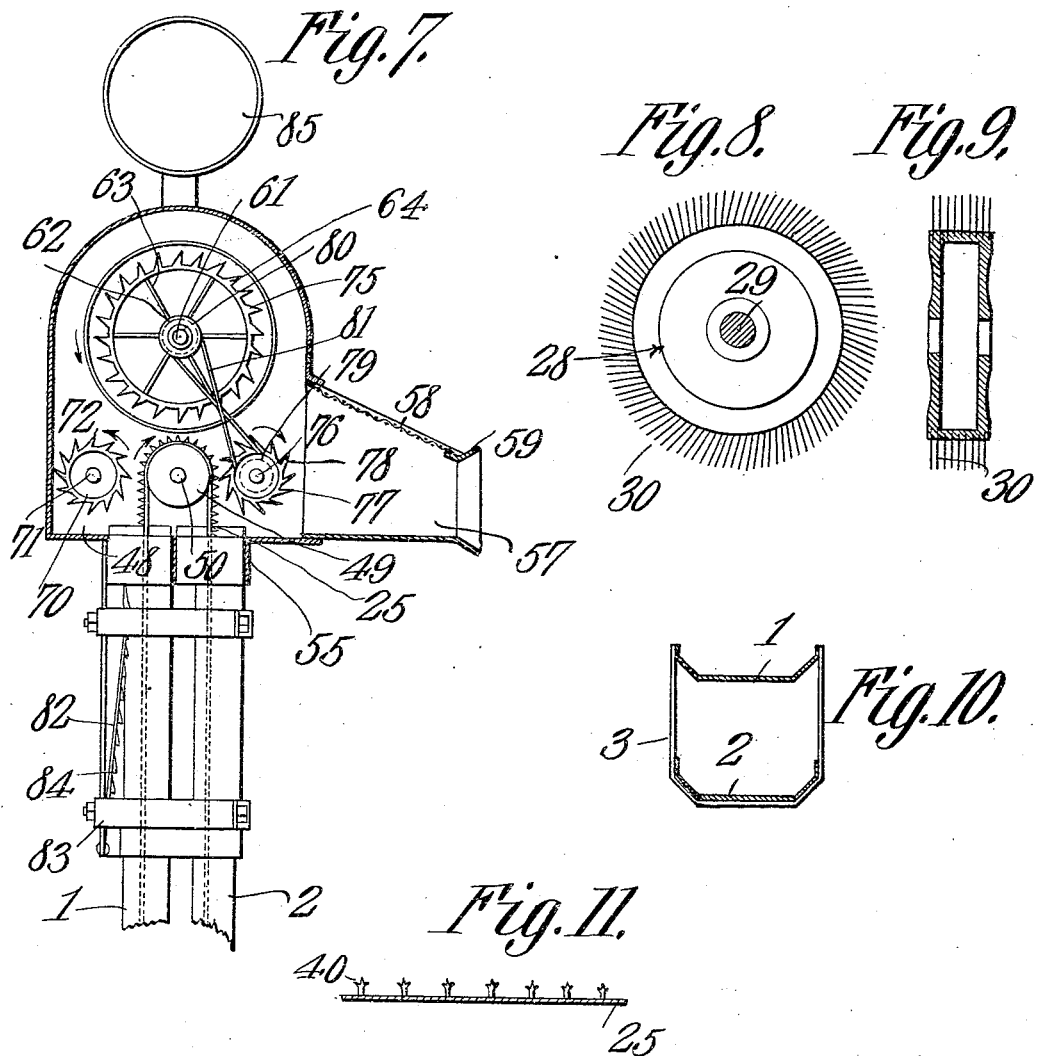

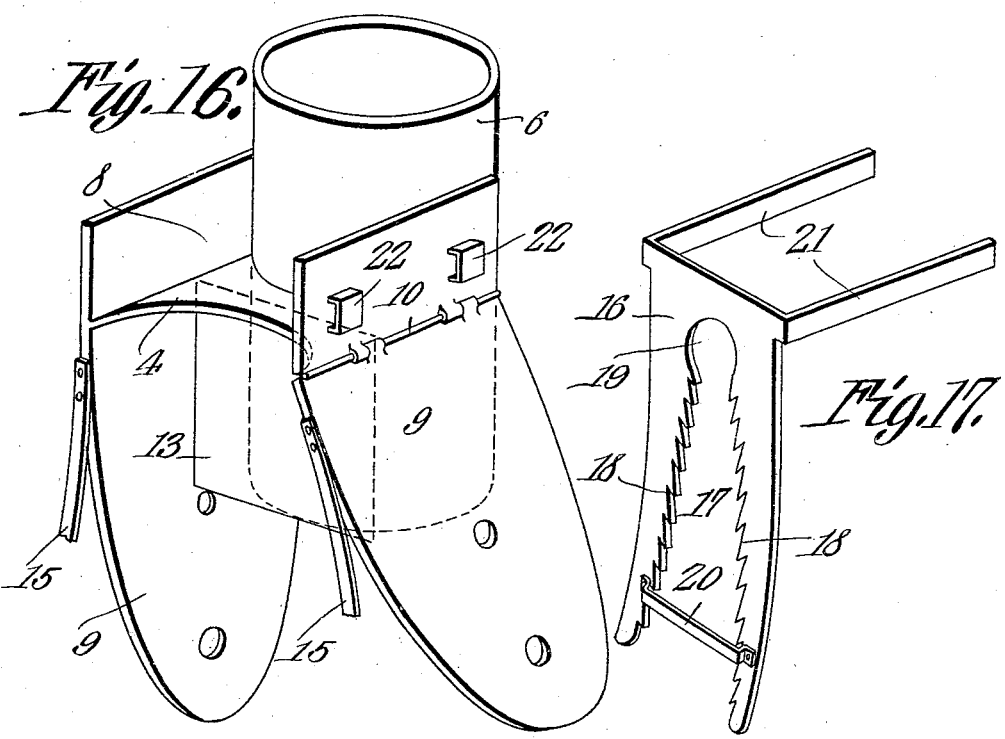
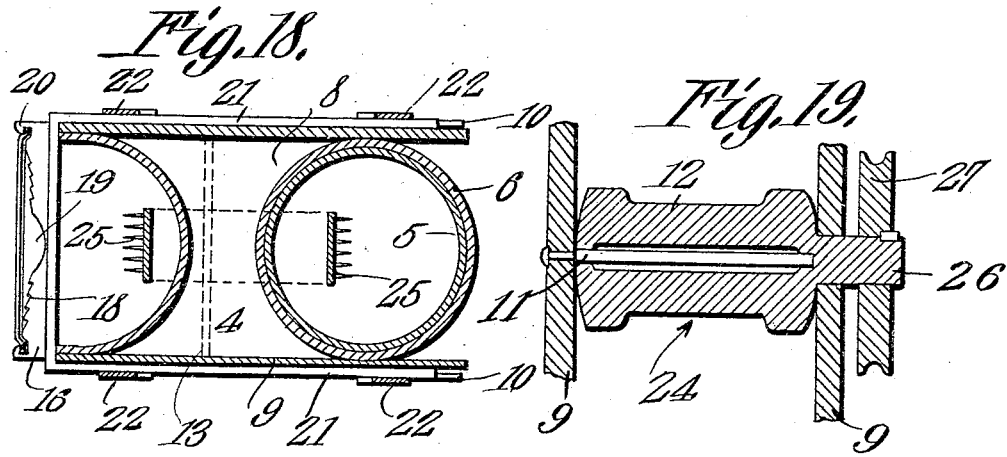

WILLIAM W. BAYS, OF CHARLOTTE, NORTH CAROLINA.

COTTON-PICKER.

941,055.  Specification of Letters Patent.  Patented Nov. 23, 1909.

Application filed May 16, 1908.  Serial No. 433,307.

*To all whom it may concern:*

Be it known that I, WILLIAM W. BAYS, a citizen of the United States, residing at Charlotte, in the county of Mecklenburg and State of North Carolina, have invented a new and useful Cotton-Picker, of which the following is a specification.

This invention relates to cotton picking and gathering devices, or machines, and it consists in the novel construction and arrangement of its parts as hereinafter described.

The object of this invention is to provide a cotton picking and cotton gathering device, which is simple in construction, inexpensive, and useful and efficient in operation.

A further object of my invention is to provide a cotton picking and cotton gathering device, that can be supported by, and suspended from, the shoulder of an operator and operated manually and which can be quickly and conveniently applied to any part of the cotton stalk where the cotton bolls are open.

Moreover, the object of my invention is to provide a cotton picking and cotton gathering device or machine which can be readily applied to the lint of the open cotton bolls without injury to the cotton stalk or plant, or the unripe and unopened cotton bolls.

For picking cotton, various devices or machines have been resorted to, and operated chiefly by horse-power or mechanical power, such as steam or gasolene engines, etc. But the objection to such machines is, that they are heavy, cumbersome and costly, not easily controlled, and not easily and efficiently applied to the opened cotton bolls; and especially, that they cannot be easily thus applied without injury to the cotton plant and to the unripe and unopened cotton bolls. The object of such machines is generally, to cover the entire range of cotton plant, and especially of all the open cotton bolls. But the picking device or devices, not being applied to the cotton bolls, one by one, they have succeeded in picking the cotton only in part, from the already open cotton bolls, and with the additional disadvantage, of gathering much "trash", such as grass, sticks, leaves, and the hulls or "shells" of the open cotton bolls, thus materially damaging the gathered cotton lint, and lessening the value of the same. This is especially so with devices meant to pick the cotton lint by means of suction. Moreover, another disadvantage of those cotton picking machines that are operated by horse-power, steam power or their equivalents is, that they have to be moved or progressed through the cotton field too rapidly, or with too much momentum, to allow the picking devices to be readily applied to all the open cotton bolls along their routes, and moreover, if they miss any of the opened cotton bolls, they cannot conveniently be stopped to return to the bolls thus missed, but the machine has to be moved on, and thus the cotton bolls that are missed by the machinery are left unpicked. It is thus seen to be impracticable, if not impossible, to conveniently and efficiently apply cotton picking machines that are operated by horse-power, or steam power or their mechanical equivalents, to the individual cotton bolls, one by one; the speed and the momentum with which they have to be moved, as well as the rigidity and bulkiness of such cotton picking machines preventing it. Moreover, the cost of such machines is such that the cotton farmer with but limited means cannot purchase them, nor profitably operate them, were they otherwise satisfactory.

My invention is designed to be supported on or by the shoulder of an operator and operated manually, thus it can be easily and effectually applied to any and all open cotton bolls, because the device is simple, and lacking in bulk and weight. The operator can stop with it when and where necessary; or should he at first miss any of the opened cotton bolls, he can easily return to them and secure the lint, and all without the least injury to the cotton plant, or to the unripe cotton bolls, and also without gathering any trash, such as leaves, sticks, grass, etc., along with the lint; or if perchance such "trash" should be gathered the device is so made as to separate and expel it, as hereinafter explained.

In the accompanying drawing: Figure 1 is a side elevation of the cotton picker. Fig. 2 is a front elevation of the lower end of the picker. Fig. 3 is a side elevation of the lower end of the picker. Fig. 4 is a front elevation of the upper end of the picker. Fig. 5 is a side elevation of the upper portion of the picker with parts in section. Fig. 6 is a transverse sectional view through the troughs of the picker. Fig. 7 is a side elevation of the upper portion of a modified form of the picker with parts in section. Fig. 8 is a side elevation of a modified form of picking disk which may be used. Fig. 9 is a transverse sectional view of the said disk. Fig. 10 is a transverse sectional view of modified forms of troughs which may be used in the picker. Fig. 11 is a transverse sectional view of one form of elevator belt which may be used upon the picker. Figs. 12, 13 and 14 are modified forms of elevator belts. Fig. 15 is a detail sectional view of a fixed axle or axles, and the spools, (hereinafter mentioned), mounted and journaled for rotation thereon. Fig. 16 is a detail perspective view of the lower foot piece detached. Fig. 17 is a similar view of the lower retarder or spreader detached. Fig. 18 is a transverse sectional view through the lower portion of the picker showing the foot piece, the troughs and the retarders. Fig. 19 is a detail sectional view of the lower spool for the support of the elevator belt.

The trough 1 is arranged above and in parallel relation with the trough 2. Said troughs are of like configuration and dimensions and they may be concaved as shown in Fig. 6 or may have slanting sides and flat bottoms as shown in Fig. 10. The troughs are connected with each other by the U-shaped braces 3 disposed at suitable intervals along their lengths. Said troughs are open along the major portions of their upper sides thereby rendering them light in weight, inexpensive to manufacture and durable in nature. By having the troughs open as described the elevator (to be explained hereinafter) which moves in the troughs, is visible to the operator along the greater portion of its length. The lower end of the trough 1 is supported upon the cross piece 4.

The lower end of the trough 2 is provided with a cylindrical portion 5 which is adapted to be inserted in the sleeve 6 which is adapted to bear at its inner end against the shoulder 7 mounted upon the said trough 2. The said sleeve 6 passes transversely through the cross piece 4 and is fixed with relation thereto. The foot 8 is mounted upon the sleeve 6. Thus it will be seen that when the sleeve 6 is removed from the trough 2 the foot, 8, is carried with the same. By this means the cotton picker may be provided with interchangeable feet, which, in turn, may be provided with cotton picking devices of various sizes.

One of the side walls, 9, of the foot, 8, is hingedly mounted as at 10, and may be swung laterally, in order to receive, or to permit the removal therefrom, of the spool, 12, and the axle, 29. Preferably the axle 11, of the spool 12, is fixed to one of the side walls 9 and the spool 12 is journaled for rotation on the axle 11, and the spool 12, is provided with a concentric stud 26 which receives one end of the axle 11, as indicated in Fig. 19. The said stud 26 passes through one of the side walls 9 and the pulley 27 is mounted on the stud 26. But if desired the spool 12 may be fixed on the axle 11, and the said axle 11 may be journaled for rotation in the side walls 9 and the pulley 27 may be mounted on one end of the axle 11 as indicated in Figs. 1 and 2. The side walls 9 of the foot piece are maintained in spaced relation by a longitudinally disposed brace plate 13 that is rigidly secured to the fixed side wall 9 and the supporting plate 4, and the hinged side wall 9 is held inward in a position parallel to the side wall by means of the cross bolt 14. The guard strips 15 are mounted upon the upper edges of the side walls 9 and extend forward beyond the ends of the said walls 9. The said strips are located over the end portions of the axles 11 and 29 to prevent the cotton lint from winding about the said axles at their journal bearings in the side walls 9.

The elongated plate 16 is mounted upon the foot 8 and is slightly concaved longitudinally. The said plate is provided with a substantially V-shaped opening, 17 having at its edges the teeth 18 which are downwardly inclined. The said teeth are designed to arrest or retard the introduction of the cotton lint into the trough 1 as it is withdrawn from the picking mechanism (hereinafter to be described) and thereby prevent the cotton from choking in the trough 1. The opening 17 terminates in the circular perforation 19, and the forward portions of the plate 16 are braced by an arch cross strip 20 which is attached at its ends to the side portions of the said plate, and which bridges the opening 17. The plate 16 is provided with arms at its rear edge, said arms forming a U-shaped clip 21 which straddles the rear portion of the foot 8 and which is detachably mounted in the eyes 22 located at the sides of the foot, 8. The plate 16 may be adjusted with relation to the trough 1 and when it is desired to remove the plate 16 this can be readily done by lifting the clip 21 out of the eyes 22.

The spool 12 is provided with a peripheral groove, 24 and the elevator belt 25 is adapted to operate around the said spool and in the groove therein.

The picking wheel 28 is preferably composed of several disks or saws joined to each other and fixed upon the shaft, 29. The teeth 30 of the said saws may be of any desired configuration and disposed at any effective angle. The picking wheel 28 is elevated with relation to the spool 12 and is located in advance of the same. The extension 31 of the walls 9 are inclined at an angle of approximately 45° to the longer axes of the troughs 1 and 2 and the shaft 29 is journaled for rotation in the said extensions. The lower or outer end of the strips 15 are curved around the lower or outer ends of said extensions 31. The pulley 32 is mounted upon the shaft 29 and the belt 33 passes around the pulleys 27 and 32. The pulley 32 is considerably larger than the pulley 27, consequently, the said pulleys do not rotate at the same rate of speed. The pulley 34 is also mounted upon the shaft 29 and the auxiliary belt 35 passes around the pulley 34 and a driving pulley as will be hereinafter explained.

At intervals along the trough 1 may be located the retarders or spreaders 36, which consist of a V-shaped bar or bars having upon their under sides the downwardly disposed teeth 37. Said bars are mounted upon the clips 38 which in turn are supported in the eyes 39 carried by the braces 3. The said retarders may be located at any desired points along the trough 1 and they have a tendency to spread the lint over the belt 25 and prevent the same from balling or choking in the trough 1 and in the removing device hereinafter described.

The elevator conveyer 25 may be made in either of the forms as illustrated in Figs. 11, 12, 13 and 14 of the drawing. In the form as shown in Fig. 11 the said belt consists of a metallic strip having the pointed tines 40 cut therefrom and bent up at an angle thereto. In the form as shown in Fig. 12 the belt 25 may consist of a strip 41 of leather or canvas upon the outer side of which is mounted a strip 42 provided with the bristles 43. In the form of belt as shown in Fig. 13 the strip 44 is mounted upon the plurality of endless flexible elements 45 and the teeth 46 are alternately arranged with relation to the bristles 47 and are spaced at relatively greater distances therefrom than the distance between the bristles, as shown in Fig. 12. In the form of belt as shown in Fig. 14 the strip 44 is mounted upon a single endless flexible element 41. The object of the arrangement of the teeth and bristles, as shown in Figs. 13 and 14, is that they will not have a tendency to draw the lint together but on the other hand will have a tendency to spread the same and thereby reduce the possibility of the lint choking the picker. Any suitable form of elevator 25 may be used.

The cap or casing 48 is located at the upper ends of the troughs 1 and 2. The said casing may be detachably connected with the said troughs or fixed thereto. The spool 49 preferably is mounted and journaled for rotation on the axle 50 and said axle 50 is fixed to one of the side walls of the cap or casing 48 as shown in Fig. 15. And as in the case of spool 12 (as above herein stated), the spool 49 is also provided with a concentric stud 50′ as seen in Fig. 15, the stud 50′ passing through one of the side walls of the casing 48. The pulley 53 is mounted on the said stud 50′. But if desired, the axle 50 may be journaled for rotation in the walls of the casing 48 and the spool 49 may be fixed on the axles 50 and the pulley 53 may be mounted on one end of the axle or shaft 50 as indicated in Fig. 4.

The elevator belt 25 passes around the spool 49 in the groove 51 thereof and also is adapted to move orbitally traversing the lengths of the troughs 1 and 2. The upper end of the trough 1 is in close proximity to the periphery of the spool 49. The ends of the spool 49 are located within the guards 52 mounted upon the inner sides of the cap 48 and which are adapted to prevent the lint from entering between the ends of the spool and the sides of the said casing and winding about the shaft 50. The upper end of the trough 1 is provided with a cylindrical portion 54 thus making the upper end of the said trough circular in cross section and extending completely around the upper portion of the belt 25. The upper end of the trough 2 is similarly arranged. The casing 48 is provided with thimbles 55 which receive the upper ends of the said troughs 1 and 2. The said casing is also provided with suitable air inlet openings.

The saddle 56 is attached to the casing 48 and trough 2 and is adapted to rest upon the shoulder of an operator. The spout 57 is attached to the side of the casing 48 and lies over the said saddle 56. Said spout is provided upon its upper side with a sieve 58 and at its outer end with a flared portion 59. The bag 60 is adapted to be secured to the flared portion 59 of the spout 57 and hangs along the back of the operator. The shaft 61 is journaled for rotation in the casing 48 and the fan wheel 62 is mounted upon the said shaft. The said wheel is provided with the shorter fan blades 63 and the longer fan blades 64 and a weighted rim 65 which performs the function of a fly wheel. The long and short blades of the fan wheel 62 are separated from each other by the open center partition 62′. The bristles 66 are mounted upon the periphery of the wheel 62 which carries the short fan blades 63 and at the sides of the outer portions of the longer fan blades 64. If desired the wheel 62 may be provided with the teeth 67 which coöperate with the bristles 66. The pulley 68 is mounted upon the shaft 61 and the belt 69 passes around the said pulley. The spool 70 is mounted upon the shaft 71 which is journaled for rotation in the casing 48 adjacent the shaft 50. The said spool is provided upon its periphery with the teeth 72. The pulley 73 is mounted upon the shaft 71 and the belt 74 passes around the said pulley. The object of providing the spool 70 is to loosen the larger fleeces of cotton lint that may gather within the casing 48 before the same is passed between the spool 49 and the wheel 62.

In the form of the device as shown in Fig. 7 the bristles 66 and tines 67 mounted upon the wheel 62, as shown in Fig. 5, are dispensed with and the teeth 75 are substituted in lieu thereof. The shaft 76 is journaled for rotation in the casing 48 adjacent the shaft 50 and the spool 77 is mounted upon the shaft 76. The teeth 78 are carried by the spool 77. The pulley 79 is mounted upon the shaft 76 and the pulley 80 is mounted upon the shaft 61. The cross belt 81 transmits movement from the shaft 61 to the shaft 76. The object in providing the spool 79 is to afford means for positively removing such lint from the belt 25 that may adhere thereto after having passed by the wheel 62.

In the form of the device as shown in Fig. 7 instead of using the spreading bars 36 at the upper end of the trough 1 the spreader 82 may be employed. The said spreader is fixed to a support 83 mounted upon the troughs and is provided with teeth 84. The end of the spreader 82 adjacent the casing 48 is free while its opposite end is fixed and as the lint passes under the said spreader the teeth 84 engage the same and evenly distribute the lint over the surface of the belt. The tool box 85 is mounted upon the top of the casing 48. Said box may be of any desired configuration.

The saddle 86 is mounted upon the troughs 1 and 2 and is located at a point to one side of a point midway between the ends thereof. The shaft 87 is journaled for rotation upon the saddle and is provided with a detachable crank handle 88. The relatively large gear wheel 89 is mounted upon the shaft 87 and meshes with a smaller gear wheel 90 mounted upon the counter shaft 91 which is also journaled upon the saddle 86. The pulley 92 is mounted upon the shaft 91 and the cross belt 35 passes around the said pulley. The pulley 93 is mounted upon the shaft 91 and the belt 69 passes around the pulley 93. The pulley 94 is mounted upon the shaft 91 and the belt 54 passes around the pulley 94. The pulley 95 is mounted upon the shaft 91 and the belt 74 passes around said pulley 95.

The operation of the cotton picker is as follows:—The operator adjusts the device upon his shoulder, as above indicated, and grasps the handle 96 with one hand and rotates the shaft 87 by means of the crank 88 with the other hand. The rotary movement is transmitted from the shaft 87 through the intervening connections to the shafts 61, 71, 50, fan wheel 62 pulleys 68, 53, &c., and also to the spool 49. The revolution of the spool 49 operates the elevator 25 which elevator 25 operates the spool 12 and the pulley 27 and thus by means of the band 33 on the pulley 32 the picking wheel 28 is operated; the picking wheel 28 thus normally deriving its motion and its power from the movement of the elevator band 25. But when the auxiliary band 35 is used the picking wheel 28 is operated or driven in part by the said band 35 and which auxiliary band 35 operates on the pulley 34 of the axle 29 and on the pulley 92 of the counter shaft 91 as seen in Figs. 2 and 4. The parts thus being in motion, the operator applies the picking wheel 28 to the lint of open cotton bolls and the teeth of the said wheel will remove the lint from the bolls, and bring it in contact with the lint engaging members carried by the belt 25. The said members upon the said belt remove the lint from the wheel 28 and the lint is carried up the trough 1. When the lint arrives in the casing 48 it is loosened by the teeth carried by the spool 70 and is caught up by the engaging members carried by the fan wheel 62. The wheel 62 removes the lint from the belt 25 and the blast of air created by the said fan wheel casts the lint aside and carries it through the spout 57 into the bag 60. The blast of air escapes from the spout 57 through the sieve 58 and carries with it the dust and other undesirable material which might be gathered in with the lint.

The parts are so connected together that the crank shaft 87 must be turned upwardly and rearwardly in order to operatively move the parts. While this movement of the said crank handle is preferable the parts may be so arranged that the crank handle may be turned in the opposite direction if desired.

In connection with the fixed axle or axles and the spools rotating thereon Fig. 15 shows in enlarged detail that the casing 48 is provided with a removable side 48' and it will thus be seen that by detaching the side 48' from the casing that the spool 49 may be removed from the shaft 50 and also the fan wheel 62 may be removed therefrom together with the shafts 61, 71, 76, and 50.

Having described my invention, what I claim as new and desire to secure by Letters Patent is:

1. A cotton picker comprising parallel troughs, an elevator belt moving in an orbit along the same, a sleeve slidably engaging one of the troughs and a cotton picking means mounted upon the sleeve.

2. A cotton picker comprising parallel troughs, an elevator belt moving in an orbit along the troughs, a sleeve slidably engaging the troughs, a foot mounted upon the sleeve, and having a fixed side wall and a hinged side wall, and a cotton picking means supported upon the side walls of the foot.

3. A cotton picker comprising parallel troughs, an elevator belt moving in an orbit along the troughs, a cotton picking means located at the end of the troughs, and a retarding means supported upon the troughs over the end of the elevator belt adjacent the picking means and spaced from the belt.

4. A cotton picker comprising parallel troughs, an elevator belt moving in an orbit longitudinally along the troughs, a cotton picking means located at the ends of the troughs, a retarding plate having a V-shaped opening located over that end of the belt adjacent the picking means.

5. A cotton picker comprising parallel troughs, an elevator belt moving in an orbit longitudinally along the troughs, a cotton picking means located at the ends of the troughs, a retarding plate having an elongated opening provided at its edges with teeth and being located over that end of the belt adjacent the picking means.

6. A cotton picker comprising parallel troughs, an elevator belt mounted for movement in an orbit longitudinally of the troughs, a cotton picking means located at the ends of the troughs, and a retarding plate having an elongated opening which terminates in an enlarged circular perforation and being located over that end of the belt adjacent the picking means.

7. A cotton picker comprising parallel troughs, an elevator belt mounted for movement in an orbit longitudinally along the troughs, a cotton picking means located at the ends of the troughs, and a retarding means located over that end of the belt adjacent the picking means, and means for adjusting the retarding means transversely with relation to the troughs.

8. A cotton picker comprising parallel troughs, an elevator belt mounted for movement in an orbit longitudinally along the troughs, a cotton picking means located at one end of the belt, a wheel located at the opposite end thereof, and having long and short fan blades and cotton engaging members mounted upon said wheel at the ends of the shorter fan blades and at the sides of the longer fan blades.

9. A cotton picker comprising parallel troughs, an elevator belt mounted for movement longitudinally along the troughs, a cotton picking means located at one end of the belt, a cotton removing wheel located at the opposite end thereof and a spool journaled for rotation at the delivery end of the belt and having teeth adapted to free the belt of the cotton which should pass by the cotton removing wheel.

10. A cotton picker comprising parallel troughs, an elevator belt mounted for movement longitudinally along the troughs, a cotton picking means located at one end of the belt, a cotton removing means located at the opposite end of the belt and a cotton loosening spool journaled for rotation near the delivery end of the belt and having teeth for engaging the lint.

11. A cotton picker comprising parallel troughs, an elevator belt mounted for movement longitudinally along the same, a cotton picking means located at one end of the belt, a cotton removing means located at the opposite end thereof, a curved saddle for engaging the operator's shoulder and connected with the troughs and located between the cotton picker and the cotton receiving means, and a handle connected with the troughs for directing the same.

12. A cotton picker comprising parallel troughs, an elevator belt mounted for movement longitudinally along the same, a cotton picking means located at one end of the belt, a cotton removing means located at the opposite end thereof, and a laterally disposed shoulder engaging saddle connected with the troughs and located at a point between the cotton picker and the cotton receiving means.

13. A cotton picker comprising parallel troughs, an elevator belt mounted for movement longitudinally along the same, a cotton picking means located at one end of the belt, a cotton removing means located at the opposite end thereof, a laterally disposed shoulder saddle connected with the troughs, and a delivery spout located above said saddle.

14. A cotton picker comprising parallel troughs, an elevator belt mounted for movement longitudinally along the troughs, a cotton picking means located at one end of the belt, a cotton removing means located at the opposite end thereof, a laterally disposed shoulder saddle connected with the troughs, a delivery spout located above the saddle and having a flared delivery end for connection with a receiving bag.

15. A cotton picker comprising parallel troughs, an elevator belt mounted for movement longitudinally along the same, a cotton picking means located at one end of the belt, a cotton removing means located at the opposite end of the belt, and comprising means for creating an air blast, a shoulder saddle connected with the troughs, a spout located adjacent said saddle and having its side provided with a sieve and to receive the air blast and cotton from the delivery end of the elevator belt.

In testimony that I claim the foregoing as my own, I have hereto affixed my signature in the presence of two witnesses.

WILLIAM W. BAYS.

Witnesses:
W. C. MICHAEL,
G. W. BORING.